(12) United States Patent
Li et al.

(10) Patent No.: US 12,150,099 B2
(45) Date of Patent: Nov. 19, 2024

(54) METHOD AND APPARATUS FOR AGGREGATION AND TRANSMISSION OF MULTI-USER UPLINK DATA

(71) Applicant: Huawei Technologies Co., Ltd., Shenzhen (CN)

(72) Inventors: Shengyu Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/704,472

(22) Filed: Mar. 25, 2022

(65) Prior Publication Data

US 2022/0217692 A1 Jul. 7, 2022

Related U.S. Application Data

(63) Continuation of application No. PCT/CN2020/112625, filed on Aug. 31, 2020.

(30) Foreign Application Priority Data

Sep. 27, 2019 (CN) .......................... 201910924529.5

(51) Int. Cl.
*H04W 72/04* (2023.01)
*H04W 72/044* (2023.01)

(52) U.S. Cl.
CPC .............................. *H04W 72/044* (2013.01)

(58) Field of Classification Search
CPC ............ H04W 72/044; H04W 72/1268; H04L 5/0053; H04L 1/0041; H04L 5/0055;
(Continued)

(56) References Cited

U.S. PATENT DOCUMENTS 9,615,382 B2 4/2017 Ljung
10,158,474 B2 12/2018 Cherian et al.
(Continued)

FOREIGN PATENT DOCUMENTS

CN 101496335 A 7/2009
CN 104219710 A 12/2014
(Continued)

*Primary Examiner* — Jay P Patel
(74) *Attorney, Agent, or Firm* — SLATER MATSIL, LLP

(57) ABSTRACT

A method and an apparatus for aggregation and transmission of multi-user uplink data, the method including obtaining first indication information by a first terminal device of N terminal devices in a terminal device group, the first indication information being location information of uplink data of the N terminal devices in a first uplink bit sequence including the uplink data of the N terminal devices, obtaining the uplink data of the N terminal devices, determining the first uplink bit sequence based on the first indication information and the uplink data of the N terminal devices, receiving second indication information from a network device, where the second indication information includes information about a first time-frequency resource, obtaining a second uplink bit sequence by performing channel coding on the first uplink bit sequence, and sending the second uplink bit sequence on the first time-frequency resource.

20 Claims, 5 Drawing Sheets

(58) Field of Classification Search
CPC ..... H04L 5/0094; H04L 5/0048; H04L 1/004; H04L 5/001; H04L 5/0057
See application file for complete search history.

(56) References Cited

U.S. PATENT DOCUMENTS

| | | |
|---|---|---|
| 2003/0203716 A1 | 10/2003 | Takahashi et al. |
| 2014/0376456 A1 | 12/2014 | Kim et al. |
| 2015/0003390 A1* | 1/2015 | Cheng .................... H04L 1/1671 370/329 |
| 2018/0084586 A1 | 3/2018 | McCoy et al. |
| 2018/0184419 A1* | 6/2018 | Yang ................. H04W 72/0446 |

FOREIGN PATENT DOCUMENTS

| | | | |
|---|---|---|---|
| CN | 105723629 A | 6/2016 | |
| CN | 107534524 A | 1/2018 | |
| CN | 109041077 A | 12/2018 | |
| WO | WO-2018113776 A1 * | 6/2018 | .............. H04W 4/70 |

\* cited by examiner

METHOD AND APPARATUS FOR AGGREGATION AND TRANSMISSION OF MULTI-USER UPLINK DATA

CROSS-REFERENCE TO RELATED APPLICATIONS

This application is a continuation of International Application No. PCT/CN2020/112625, filed on Aug. 31, 2020, which claims priority to Chinese Patent Application No. 201910924529.5, filed on Sep. 27, 2019. The disclosures of the aforementioned applications are hereby incorporated by reference in their entireties.

TECHNICAL FIELD

Embodiments of this application relate to the field of wireless communication, and in particular, to a method and an apparatus for aggregation and transmission of multi-user uplink data.

BACKGROUND

Compared with a $4^{th}$ generation (4G) mobile communication system, a $5^{th}$ generation (5G) mobile communication system has a significant feature of support for ultra-reliable and low-latency communication (URLLC) services. There are a plurality of types of URLLC services, which are typically used in industrial control, self driving, remote surgery, and smart grids. The URLLC services typically require that reliability of sending 32-byte data within 1 millisecond (ms) needs to reach 99.999%. It should be noted that, this performance indicator is merely an example, and different URLLC services may have different requirements for reliability. For example, in some extremely demanding application scenarios in industrial control, a success probability of URLLC service data transmission within 0.25 ms needs to reach 99.9999999%.

In a plurality of URLLC application scenarios, data packets are usually small. For example, for a plurality of typical application scenarios in smart factories, downlink data packets are mostly control commands or management signaling, and uplink data packets are feedback information for execution of some actions, or information collected through simple location update or from the outside, which include only a few bytes to dozens of bytes. Because the URLLC service data transmission requires high reliability, these data packets usually need to use more resources to transmit data, to ensure reliability of data packet transmission. In a URLLC application scenario in which there are large connections and small data packet transmission, a large quantity of spectrum resources are consumed in an existing transmission manner, and a large bandwidth is required to ensure normal data transmission.

SUMMARY

This application provides a method and an apparatus for aggregation and transmission of multi-user uplink data. A plurality of adjacent terminal devices exchange original bit information, and the terminal devices perform bit aggregation and channel coding on the exchanged original bit information, to improve coding gains and air interface transmission efficiency.

According to a first aspect, this application provides a method for aggregation and transmission of multi-user uplink data. An execution body of the method is a first communication apparatus, and the first communication apparatus is a first terminal device or a module in the first terminal device. An example in which the first terminal device is the execution body is used for description herein. The first terminal device obtains first indication information, where the first indication information is location information of uplink data of each of N terminal devices in a first uplink bit sequence. The first uplink bit sequence includes the uplink data of each of the N terminal devices. The first terminal device is one of the N terminal devices. The N terminal devices are N terminal devices in a terminal device group, and N is an integer greater than 1. The first terminal device obtains the uplink data of each of the N terminal devices. The first terminal device determines the first uplink bit sequence based on the first indication information and the uplink data of each of the N terminal devices. The first terminal device receives second indication information from a network device, where the second indication information includes information about a first time-frequency resource. The first terminal device performs channel coding on the first uplink bit sequence to obtain a second uplink bit sequence. The first terminal device sends the second uplink bit sequence on the first time-frequency resource.

By implementing the method described in the first aspect, the N terminal devices obtain the uplink data of the N terminal devices through exchanging. Each of the N terminal devices performs bit aggregation on the uplink data of the N terminal devices according to a specific rule, and performs channel coding on an aggregated bit sequence, so that a sequence length before coding is increased, and a coding gain is improved.

In a possible implementation of the first aspect, the first terminal device receives the first indication information from the network device.

In a possible implementation of the first aspect, the first terminal device negotiates with N−1 terminal devices other than the first terminal device in the N terminal devices to determine a location of the uplink data of each of the N terminal devices in the first uplink bit sequence. The first terminal device sends fourth indication information to the network device, where the fourth indication information includes the location information of the uplink data of each of the N terminal devices in the first uplink bit sequence.

In a possible implementation of the first aspect, the first terminal device receives fifth indication information from the network device, where the fifth indication information is configured to indicate the first terminal device to send the uplink data to the network device.

According to a second aspect, this application provides a method for aggregation and transmission of multi-user uplink data. An execution body of the method may be a second communication apparatus, and the second communication apparatus is a network device or a module in the network device. An example in which the network device is the execution body is used for description herein. The network device sends second indication information to a first terminal device, where the second indication information includes information about a first time-frequency resource. The network device receives, on the first time-frequency resource, a second uplink bit sequence from the first terminal device. The network device performs channel decoding on the second uplink bit sequence to obtain a first uplink bit sequence, where the first uplink bit sequence includes uplink data of each of N terminal devices. The N terminal devices are N terminal devices in a terminal device group. The first terminal device is one of the N terminal devices, and N is an integer greater than 1.

The method described in the second aspect is a method in a network side corresponding to the method described in the first aspect. Therefore, beneficial effects that can be achieved by the method described in the first aspect can also be implemented by the method described in the second aspect.

In a possible implementation of the second aspect, the network device sends first indication information to the first terminal device. The first indication information includes location information of the uplink data of each of the N terminal devices in the first uplink bit sequence.

In a possible implementation of the second aspect, the network device receives fourth indication information from the first terminal device. The fourth indication information includes location information of the uplink data of each of the N terminal devices in the first uplink bit sequence.

In a possible implementation of the second aspect, the network device sends fifth indication information to the first terminal device, where the fifth indication information indicates the first terminal device to send the first uplink bit sequence to the network device.

In a possible implementation of the first aspect or the second aspect, the location information includes a start location or an end location of the uplink data of each of the N terminal devices in the first uplink bit sequence. The location information alternatively includes a sequence number of the uplink data of each of the N terminal devices in the first uplink bit sequence and a bit length of the uplink data of each of the N terminal devices in the first uplink bit sequence.

In a possible implementation of the first aspect or the second aspect, the second indication information further includes a first transmission parameter. The first transmission parameter is a transmission parameter used by the first terminal device to send the first uplink bit sequence. The second terminal device is a terminal device other than the first terminal device in the N terminal devices. A second transmission parameter is a transmission parameter used by the second terminal device to send the first uplink bit sequence. A value of the first transmission parameter is different from that of the second transmission parameter. The first transmission parameter and the second transmission parameter each include at least one of a redundancy version number, a transport layer number, and a precoding matrix.

In a possible implementation of the first aspect or the second aspect, the fifth indication information includes identification information of the first terminal device.

According to a third aspect, a communication apparatus is provided, including functional modules configured to implement the method according to the first aspect or any possible implementation of the first aspect.

According to a fourth aspect, a communication apparatus is provided, including functional modules configured to implement the method according to the second aspect or any possible implementation of the second aspect.

According to a fifth aspect, a communication apparatus is provided, including a processor and an interface circuit. The interface circuit is configured to receive a signal from a communication apparatus other than the communication apparatus and transmit the signal to the processor, or send a signal from the processor to a communication apparatus other than the communication apparatus. The processor is configured to implement the method according to the first aspect or any possible implementation of the first aspect through a logic circuit or executing code instructions.

According to a sixth aspect, a communication apparatus is provided, including a processor and an interface circuit. The interface circuit is configured to receive a signal from a communication apparatus other than the communication apparatus and transmit the signal to the processor, or send a signal from the processor to a communication apparatus other than the communication apparatus. The processor is configured to implement the method according to the second aspect or any possible implementation of the second aspect through a logic circuit or executing code instructions.

According to a seventh aspect, a computer-readable storage medium is provided. The computer-readable storage medium stores a computer program or instructions. When the computer program or the instructions is/are executed, the method according to the first aspect or any possible implementation of the first aspect is implemented.

According to an eighth aspect, a computer-readable storage medium is provided. The computer-readable storage medium stores a computer program or instructions. When the computer program or the instructions is/are executed, the method according to the second aspect or any possible implementation of the second aspect is implemented.

According to a ninth aspect, a computer program product including instructions is provided. When the instructions are run, the method according to the first aspect or any possible implementation of the first aspect is implemented.

According to a tenth aspect, a computer program product including instructions is provided. When the instructions are run, the method according to the second aspect or any possible implementation of the second aspect is implemented.

According to an eleventh aspect, a computer program is provided, where the computer program includes code or instructions. When the code or the instructions is/are run, the method according to the first aspect or any possible implementation of the first aspect is implemented.

According to a twelfth aspect, a computer program is provided, where the computer program includes code or instructions. When the code or the instructions is/are run, the method according to the second aspect or any possible implementation of the second aspect is implemented.

DETAILED DESCRIPTION OF ILLUSTRATIVE EMBODIMENTS

Figure 1:
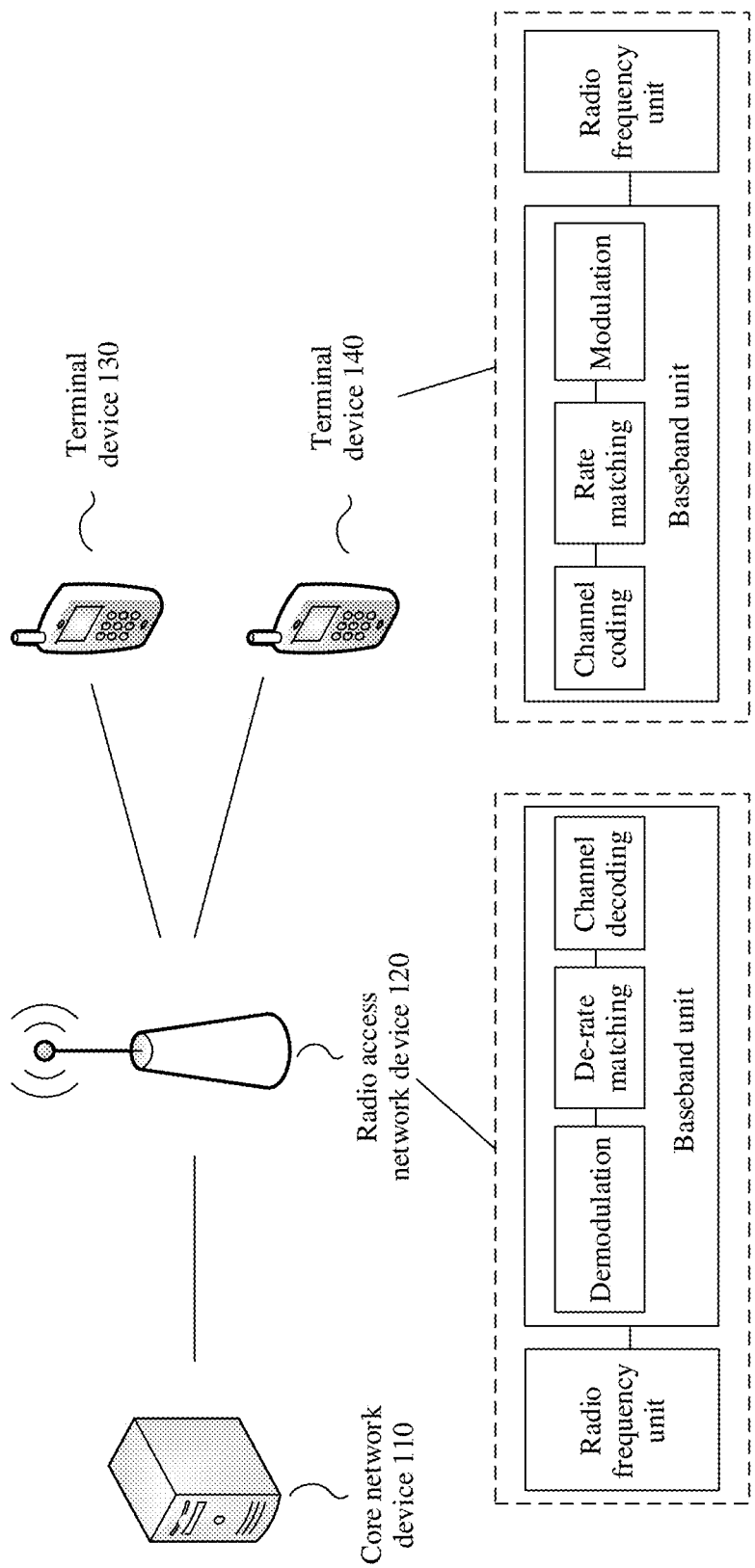
FIG. 1 is a schematic diagram of an architecture of a mobile communication system applied to an embodiment of this application.

FIG. 1 is a schematic diagram of an architecture of a mobile communication system applied to an embodiment of this application. As shown in FIG. 1, the mobile communication system includes a core network device 110, a radio access network device 120, and at least one terminal device (for example, a terminal device 130 and a terminal device 140 in FIG. 1). The radio access network device 120 includes a radio frequency unit and a baseband unit. For uplink data transmission, the baseband unit may include a demodulation module, a de-rate matching module, and a channel decoding module. The terminal device (for example, the terminal device 130 and the terminal device 140 in FIG. 1) includes a baseband unit and a radio frequency unit. For uplink data transmission, the baseband unit may include a channel coding module, a rate matching module, and a modulation module. The terminal device is connected to the radio access network device in a wireless manner, and the radio access network device is connected to the core network device in a wireless or wired manner. The core network device and the radio access network device may be different physical devices independent of each other, or functions of the core network device and logical functions of the radio access network device may be integrated into a same physical device, or some functions of the core network device and some functions of the radio access network device may be integrated into a physical device. The terminal device may be at a fixed location or be movable. FIG. 1 is merely a schematic diagram. The communication system may further include other network devices. For example, the communication system may further include a wireless relay device and a wireless backhaul device, which are not shown in FIG. 1. A quantity of core network devices, a quantity of radio access network devices, and a quantity of terminal devices included in the mobile communication system are not limited in embodiments of this application The radio access network device is an access device that is wirelessly accessed by the terminal device in the mobile communication system. The radio access network device may be a base station, an evolved NodeB (eNodeB), a transmission reception point (TRP), a next generation NodeB (gNB) in a 5G mobile communication system, a base station in a future mobile communication system, an access node in a Wi-Fi system, and the like, or may be a module or a unit that completes some functions of a base station, for example, may be a central unit (CU) or a distributed unit (DU). A specific technology and a specific device form used by the radio access network device are not limited in embodiments of this application. In this application, the radio access network device is referred to as a network device for short. Unless otherwise specified, all network devices mean radio access network devices.

The terminal device may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal device are not limited in embodiments of this application.

The network device and the terminal device may be deployed on the land, including an indoor device, an outdoor device, a handheld device, or a vehicle-mounted device, may be deployed on the water, or may be deployed on an airplane, a balloon, and a satellite in the air. Application scenarios of the network device and the terminal device are not limited in embodiments of this application.

Communication between the network device and the terminal device may be performed by using a licensed spectrum, or may be performed by using an unlicensed spectrum, or may be performed by using both a licensed spectrum and an unlicensed spectrum. The network device and the terminal device may communicate with each other by using a spectrum below 6 gigahertz (GHz), or may communicate with each other by using a spectrum above 6 GHz, or may communicate with each other by using both a spectrum below 6 GHz and a spectrum above 6 GHz. A spectrum resource used between the network device and the terminal device is not limited in embodiments of this application.

In a 5G new radio (NR) system, uplink data is carried on a physical uplink shared channel (PUSCH), and low-density parity check (LDPC) code is used for channel coding. The LDPC code features that performance advantages can be fully reflected only in the case of long code lengths. In a plurality of URLLC services, data packets are usually relatively small. Compared with large data packets, the small data packets have low coding efficiency, causing large spectrum resources consumption in a URLLC application scenario in which there are large connections and small data packet transmission.

Embodiments of this application provide a method for aggregation and transmission of multi-user uplink data. A plurality of adjacent terminal devices exchange original bit information, and the terminal devices perform bit aggregation and channel coding on the exchanged original bit information, to improve coding gains and air interface transmission efficiency.

The following describes the technical solutions in this application in detail by using some embodiments.

Figure 2:
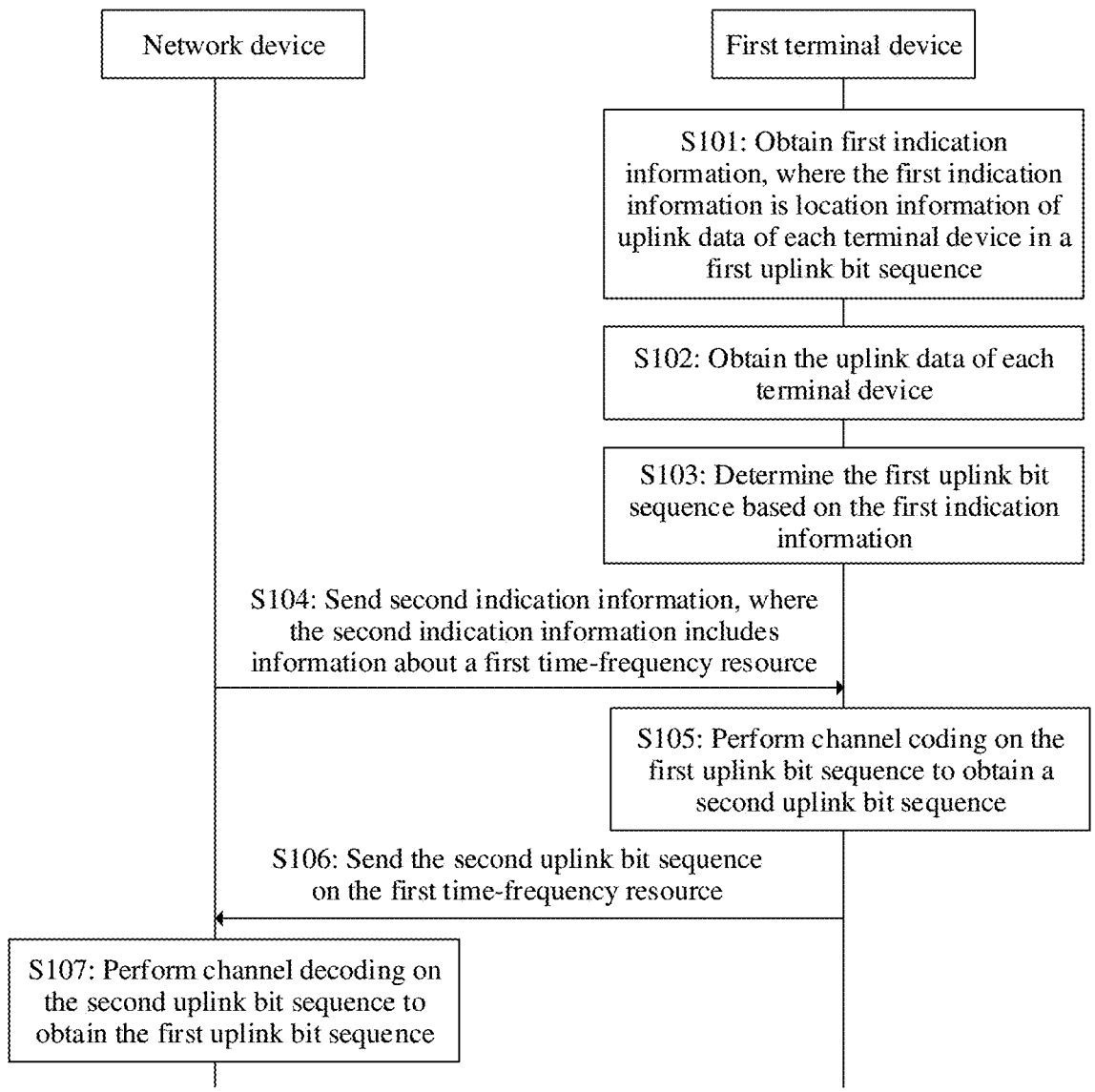
FIG. 2 is a schematic flowchart of a method for aggregation and transmission of multi-user uplink data according to an embodiment of this application.

FIG. 2 is a schematic flowchart of a method for aggregation and transmission of multi-user uplink data according to an embodiment of this application. This embodiment relates to a specific process in which a terminal device sends uplink data to a network device. A core idea of this embodiment is that a plurality of terminal devices in a terminal device group obtain uplink data of all terminal devices in the group by exchanging the uplink data. Each terminal device performs bit aggregation on the uplink data according to a specific rule, and then sends the uplink data to the network device. The following uses an example in which the network device and a first terminal device perform the method for description. The first terminal device is a terminal device in the terminal device group. It may be understood that an execution body of the method may be alternatively performed by a module in the network device and a module in the first terminal device, for example, a chip. As shown in FIG. 2, the method may include the following steps.

S101: The first terminal device obtains first indication information.

The first indication information is location information of uplink data of each of N terminal devices in a first uplink bit sequence. The first uplink bit sequence herein includes the uplink data of each of the N terminal devices. N is an integer greater than 1, and the first terminal device is one of the N terminal devices. The N terminal devices are N terminal devices in the terminal device group. Specifically, the N terminal devices may be N terminal devices that have to-be-transmitted data in the terminal device group. Optionally, the uplink data of each of the N terminal devices is data before channel coding.

The location information herein may have different implementations. For example, the location information may include a start location or an end location of the uplink data of each of the N terminal devices in the first uplink bit sequence. The location information may alternatively include a sequence number of the uplink data of each of the N terminal devices in the first uplink bit sequence and a bit length of the uplink data of each of the N terminal devices in the first uplink bit sequence. The sequence number herein may be used to indicate an aggregation sequence of the uplink data of each of the N terminal devices in the first uplink bit sequence. Therefore, the sequence number may also be referred to as an aggregation sequence number. For example, N is equal to 4. Aggregation sequence numbers of the four terminal devices may be 0, 1, 2, or 3, or may be 1, 2, 3, or 4.

Specifically, the first terminal device may obtain the first indication information in different implementations. For example, the first terminal device may receive the first indication information from the network device. Correspondingly, the network device sends the first indication information to the first terminal device, where the first indication information is carried in signaling. In this application, the signaling may be radio resource control (RRC) signaling, or may be downlink control information (DCI), or may be medium access control (MAC) layer signaling. Specifically, the network device may separately send the DCI to the N terminal devices, or the network device may send one piece of common DCI, where the common DCI is sent to all terminal devices in a cell, or the network device may send one piece of group common DCI, where the group common DCI is sent to the N terminal devices or sent to the terminal device group.

The first terminal device may alternatively negotiate with N−1 terminal devices other than the first terminal device in the N terminal devices to determine location information of the data of each of the N terminal devices in the first uplink bit sequence. Then, the first terminal device sends fourth indication information to the network device, where the fourth indication information includes the location information of the uplink data of each of the N terminal devices in the first uplink bit sequence. Specifically, the first terminal device may explicitly send the fourth indication information. For example, the fourth indication information is added to a header of the first uplink bit sequence, is carried on a same time-frequency resource as the first uplink bit sequence, and is sent by the first terminal device to the network device with the first uplink bit sequence. Alternatively, the fourth indication information is separately carried on a first preset time-frequency resource, and is sent by the first terminal device to the network device. The first terminal device may implicitly send the fourth indication information. For example, the fourth indication information may be partially implicitly carried on a demodulation reference signal (DMRS). Specifically, a cyclic shift index of the DMRS sent by each of the N terminal devices implicitly corresponds to the aggregation sequence number of the uplink data of each of the N terminal devices in the first uplink bit sequence. In this implicit implementation, the first terminal device needs to send, to the network device, the bit length of the uplink data of each of the N terminal devices in the first uplink bit sequence. The bit length may be added to the header of the first uplink bit sequence, and sent to the network device with the first uplink bit sequence. The first terminal device alternatively sends the bit length by using a second preset time-frequency resource. Correspondingly, the network device may determine the aggregation sequence number of each terminal device based on the received cyclic shift index of the DMRS, and parse to obtain the location information of the uplink data of each of the N terminal devices in the first uplink bit sequence based on the bit length of the uplink data of each terminal device in the received first uplink bit sequence.

S102: The first terminal device obtains the uplink data of each of the N terminal devices.

The first terminal device may directly obtain the uplink data of the first terminal device by using a MAC layer of the first terminal device. It may be understood that the uplink data herein is uplink data to be sent to the network device. How the first terminal device obtains uplink data of a terminal device in the N terminal devices other than the first terminal device is described below by using an example in which the first terminal device obtains uplink data of a second terminal device. The second terminal device herein is a terminal device in the N terminal devices other than the first terminal device. The second terminal device performs channel coding on the uplink data of the second terminal device, and broadcasts data obtained through channel coding on a third preset time-frequency resource by using a first preset transmission parameter. The third preset time-frequency resource and the first preset transmission parameter may be indicated by the network device, or may be determined by the N terminal devices through negotiation in advance.

The first terminal device receives the data broadcast by the second terminal device on the third preset time-frequency resource, obtains the data obtained through channel coding of the second terminal device through recovery based on the preset transmission parameter, and then performs channel decoding on the data obtained through channel coding to obtain the uplink data of the second terminal device.

In addition to obtaining the uplink data of each of the N terminal devices, the first terminal device may further obtain an identifier of each of the N terminal devices other than the first terminal device. For example, the first terminal device obtains an identifier of the second terminal device. The second terminal device may send the identifier of the second terminal device and the uplink data of the second terminal device to the first terminal device. Alternatively, the second terminal device may scramble a cyclic redundancy check (CRC) bit sequence of the uplink data of the second terminal device by using the identifier of the second terminal device, and send a scrambled cyclic redundancy check bit sequence to the first terminal device. The first terminal device traverses the identifier of each of the N terminal devices other than the first terminal device to descramble CRC bit sequences, and an identifier of a terminal device corresponding to successful descrambling is the identifier of the second terminal device.

S103: The first terminal device determines the first uplink bit sequence based on the first indication information and the uplink data of each of the N terminal devices.

Specifically, the first terminal device may determine the first uplink bit sequence based on the first indication information, third indication information, and the uplink data of each of the N terminal devices. The third indication information is sent by the network device to the terminal device by using signaling, and the third indication information includes a mapping relationship between the identifier of each terminal device in the terminal device group and an index of the terminal device in the terminal device group. M terminal devices are in the foregoing terminal device group in total, and M is an integer greater than or equal to N. For example, M is equal to 6, and identifiers of six terminal devices are ID 0, ID 1, ID 2, ID 3, ID 4, and ID 5. The third indication information is shown in Table 1. The index herein may be explicitly carried, or may be implicitly corresponding.

TABLE 1

Identifiers of terminal devices in a terminal device group

| Indexes of the terminal devices in the terminal device group | Identifiers of the terminal devices |
|---|---|
| 0 | ID 0 |
| 1 | ID 1 |
| 2 | ID 2 |
| 3 | ID 3 |
| 4 | ID 4 |
| 5 | ID 5 |

The first indication information is the location information of the uplink data of each of the N terminal devices in the first uplink bit sequence. For example, M is equal to 6, and N is equal to 4. Identifiers corresponding to the N terminal devices are ID 0, ID 2, ID 4, and ID 5. An implementation of the first indication information may be shown in Table 2. The first terminal device may jointly determine a correspondence between the identifier of the terminal device and the location information of the uplink data of the terminal device in the first uplink bit sequence based on the index of the terminal device in the terminal device group in Table 2 and Table 1. The first terminal device further determines a location of the uplink data of each of the N terminal devices in the first uplink bit sequence based on the uplink data of each of the N terminal devices and the identifier of the corresponding terminal device that are obtained in step S102, and further performs bit aggregation. Therefore, the first uplink bit sequence is determined.

TABLE 2

Correspondence between an index of a terminal device and location information

| Index of the terminal device in a terminal device group | Location information of uplink data of the terminal device in a first uplink bit sequence |
|---|---|
| 0 | Location information 1 |
| 2 | Location information 2 |
| 4 | Location information 3 |
| 5 | Location information 4 |

Specifically, an implementation of bit aggregation may be that the first terminal device determines the bit length of the uplink data of each of the N terminal devices based on a start location of the uplink data of each of the N terminal devices in the first uplink bit sequence or an end location of the uplink data of each of the N terminal devices in the first uplink bit sequence, and further perform bit aggregation based on the bit length and the start location, or based on the bit length and the end location. The implementation of bit aggregation may alternatively be that the first terminal device performs bit aggregation based on the bit length and the aggregation sequence number of the uplink data of each terminal device. For example, when N is equal to 4, the aggregation sequence number of each terminal device is shown in Table 3. It is assumed that the bit length of the uplink data of each terminal device is 20 bytes, therefore, a location of the terminal device corresponding to the index 0 in the first uplink bit sequence is the $1^{st}$ byte to the $20^{th}$ byte, a location of the terminal device corresponding to the index 2 in the first uplink bit sequence is the $21^{st}$ byte to the $40^{th}$ byte, a location of the terminal device corresponding to the index 4 in the first uplink bit sequence is the $41^{st}$ byte to the $60^{th}$ byte, and a location of the terminal device corresponding to the index 5 in the first uplink bit sequence is the $61^{st}$ byte to the $80^{th}$ byte.

TABLE 3

Correspondence among an index of a terminal device, an aggregation sequence number, and a bit length

| Index of the terminal device in a terminal device group | Aggregation sequence number | Bit length |
|---|---|---|
| 0 | 0 | 20 bytes |
| 2 | 1 | 20 bytes |
| 4 | 2 | 20 bytes |
| 5 | 3 | 20 bytes |

S104: The network device sends second indication information to the first terminal device.

Correspondingly, the first terminal device receives the second indication information, where the second indication information includes information about a first time-frequency resource. The first time-frequency resource is a time-frequency resource used by the first terminal device to send the uplink data of the N terminal devices to the network device.

In this embodiment, the first terminal device needs to send the uplink data of the N terminal devices to the network device, and the N-1 terminal devices also need to send the uplink data of the N terminal devices to the network device. It is assumed that the second terminal device is one of the N-1 terminal devices, and a time-frequency resource used by the second terminal device to send the uplink data of the N terminal devices to the network device is a second time-frequency resource. The first time-frequency resource and the second time-frequency resource may completely overlap, or partially overlap, or not overlap at all. It may be understood that a size of a transport block sent by the first terminal device on the first time-frequency resource is the same as a size of a transport block sent by the second terminal device on the second time-frequency resource.

Optionally, the second indication information further includes a first transmission parameter. The first transmission parameter is a transmission parameter used by the first terminal device to send the first uplink bit sequence. A value of the first transmission parameter and a value of a second transmission parameter may be the same or different. The second transmission parameter is a transmission parameter used by the second terminal device to send the first uplink bit sequence, and the second transmission parameter is indicated by the third indication information. The first transmission parameter and the second transmission parameter may include a modulation and coding scheme (MCS), and may further include at least one of a redundancy version (RV), a transport layer number, and a precoding matrix. Specifically, the second indication information and the third indication information may be carried by the DCI. In a possible implementation, the second indication information and the third indication information are carried by different DCI, for example, carried by respective UE-specific DCI of the first terminal device and the second terminal device. In another possible implementation, the second indication information and the third indication information are carried by same DCI, for example, carried by group common DCI corresponding to the terminal device group. Specifically, the first transmission parameter and the second transmission parameter each may include the RV. The RV in the first transmission parameter and the RV in the second transmission parameter may be the same or different. When the first time-frequency resource and the second time-frequency resource partially overlap or completely overlap, the first transmission parameter and the second transmission parameter each may further include the transport layer number and a total quantity of transport layers, and the transport layer number in the first transmission parameter may be different from the transport layer number in the second transmission parameter. Alternatively, the first transmission parameter and the second transmission parameter each may further include the precoding matrix, and the precoding matrix in the first transmission parameter may be different from the precoding matrix in the second transmission parameter.

S105: The first terminal device performs channel coding on the first uplink bit sequence to obtain a second uplink bit sequence.

The first terminal device performs channel coding on the first uplink bit sequence. Optionally, the first terminal device may perform channel coding after performing a specific mapping operation on the first uplink bit sequence. The mapping operation may include interleaving and/or permutation, or performing mapping according to a specific pattern.

S106: The first terminal device sends the second uplink bit sequence on the first time-frequency resource. Correspondingly, the network device receives the second uplink bit sequence on the first time-frequency resource based on the first transmission parameter.

Specifically, the first terminal device modulates the second uplink bit sequence and maps a modulated second uplink bit sequence to the first time-frequency resource based on the first transmission parameter, and sends the second uplink bit sequence to the network device.

S107: The network device performs channel decoding on the second uplink bit sequence to obtain the first uplink bit sequence.

Optionally, the network device receives the second uplink bit sequence from the first terminal device on the first time-frequency resource. The network device receives a third uplink bit sequence from the second terminal device on the second time-frequency resource, where the third bit sequence is obtained through channel coding performed by the second terminal device on the first uplink bit sequence. The network device performs channel coding on the received second uplink bit sequence and the received third uplink bit sequence to obtain the first uplink bit sequence.

Optionally, the network device receives the second uplink bit sequence and the third uplink bit sequence on the first time-frequency resource, and performs channel decoding on the received bit sequences to obtain the first uplink bit sequence.

Further, the network device obtains the uplink data of each terminal device based on the location information of the uplink data of each of the N terminal devices in the first uplink bit sequence.

In this embodiment, the N terminal devices obtain the uplink data of the N terminal devices through exchanging. Each of the N terminal devices performs bit aggregation on the uplink data of the N terminal devices according to a specific rule, and performs channel coding on an aggregated bit sequence, so that a sequence length before coding is increased, and a coding gain is improved.

Figure 3:
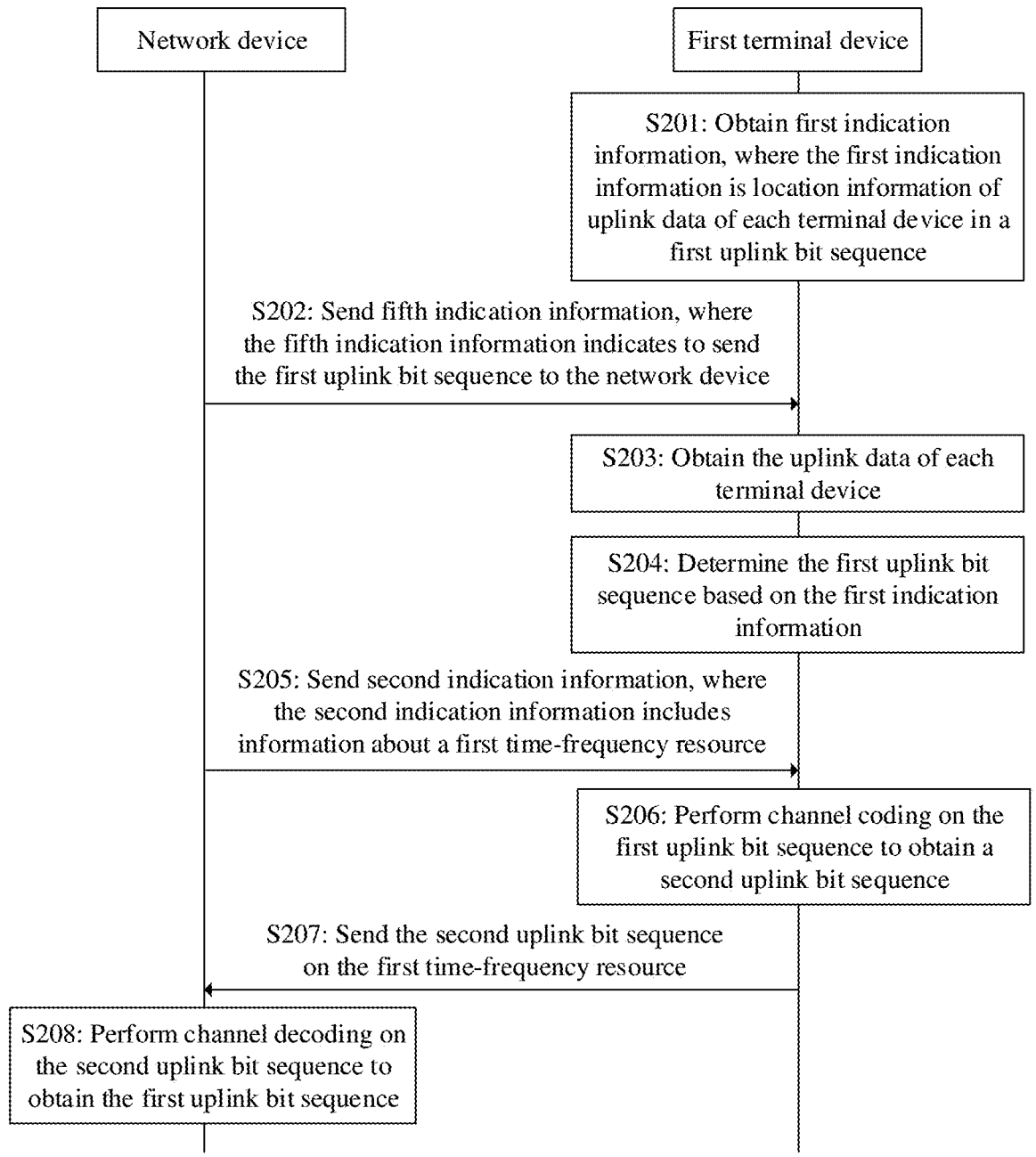
FIG. 3 is a schematic flowchart of a method for aggregation and transmission of multi-user uplink data according to an embodiment of this application.

FIG. 3 is a schematic flowchart of a method for aggregation and transmission of multi-user uplink data according to an embodiment of this application. This embodiment relates to a specific process in which a terminal device sends uplink data to a network device. A core idea of this embodiment is that the network device selects one terminal device. After obtaining uplink data of another terminal device, the terminal device performs bit aggregation on the uplink data of the another terminal device, and then sends the uplink data of the another terminal device to the network device. The following uses an example in which the network device and a first terminal device perform the method for description. The first terminal device is a terminal device in the terminal device group. It may be understood that an execution body of the method may be alternatively performed by a module in the network device and a module in the first terminal device, for example, a chip. As shown in FIG. 3, the method includes the following steps.

S201: The first terminal device obtains first indication information. For detailed descriptions of this step, refer to S101 in FIG. 2.

S202: The network device sends fifth indication information to the first terminal device. Correspondingly, the first terminal device receives the fifth indication information from the network device.

The fifth indication information is used to indicate the first terminal device to send uplink data to the network device. Optionally, the fifth indication information includes identification information of the first terminal device. The identification information herein may be an index of the first terminal device in the terminal device group, or may be an identifier of the first terminal device. Specifically, the fifth indication information is carried by using signaling.

Specifically, the network device may determine the first terminal device that sends the uplink data based on at least one piece of the following information: a channel quality indicator (CQI) or a radio resource management (RRM) measurement result. The RRM measurement result herein may be that the first terminal device that sends the uplink data is determined based on a reference signal received power (RSRP). For example, the network device selects a terminal device with best channel quality as the first terminal device. In addition, the network device may also determine the first terminal device based on geographical location information. For example, the network device selects a terminal device at a central location of N terminal devices as the first terminal device.

S203: The first terminal device obtains the uplink data of each of the N terminal devices.

The first terminal device may directly obtain the uplink data of the first terminal device by using a MAC layer of the first terminal device. How the first terminal device obtains uplink data of a terminal device in the N terminal devices other than the first terminal device is described below by using an example in which the first terminal device obtains uplink data of a second terminal device. The second terminal device herein is a terminal device in the N terminal devices other than the first terminal device. The second terminal device performs channel coding on the uplink data of the second terminal device, and sends data obtained through channel coding to the first terminal device on a fourth preset time-frequency resource by using a second preset transmission parameter. Optionally, the fourth preset time-frequency resource and the second preset transmission parameter may be indicated by the network device, or may be determined by the N terminal devices through negotiation in advance. The first terminal device receives the data sent by the second terminal device on the fourth preset time-frequency resource, and recovers the uplink data of the second terminal device based on the second preset transmission parameter. A method for obtaining an identifier of the second terminal device by the first terminal device is the same as step S102, and details are not described herein again.

S204: The first terminal device determines a first uplink bit sequence based on the first indication information and the uplink data of each of the N terminal devices. For detailed descriptions of this step, refer to S103 in FIG. 2.

S205: The network device sends second indication information to the first terminal device. Correspondingly, the first terminal device receives the second indication information from the network device.

The second indication information includes information about a first time-frequency resource. Optionally, the second indication information further includes a first transmission parameter. The first transmission parameter is a transmission parameter used by the first terminal device to send the first uplink bit sequence. The first transmission parameter may include at least one of an MCS, an RV, or a precoding matrix. Specifically, the second indication information may be carried by DCI.

S206: The first terminal device performs channel coding on the first uplink bit sequence to obtain a second uplink bit sequence. For detailed descriptions of this step, refer to S105 in FIG. 2.

S207: The first terminal device sends the second uplink bit sequence on the first time-frequency resource.

The first terminal device modulates the second uplink bit sequence and maps a modulated second uplink bit sequence to the first time-frequency resource based on the first transmission parameter, and sends the second uplink bit sequence to the network device.

S208: The network device performs channel decoding on the second uplink bit sequence to obtain the first uplink bit sequence.

Further, the network device obtains the uplink data of each terminal device based on location information of the uplink data of each of the N terminal devices in the first uplink bit sequence.

In this embodiment, the network device selects one terminal device to send data of all terminal devices. The terminal device receives uplink data from the N−1 terminal devices, performs bit aggregation on the uplink data of the N terminal devices according to a specific rule, and then performs channel coding on an aggregated bit sequence. Compared with the conventional technology in which each terminal device sends its own uplink data to the network device, this manner of this embodiment can be used to increase a sequence length before coding, and improve a coding gain. In addition, the terminal device with the best channel quality in the N terminal devices is selected to send all the uplink data of the N terminal devices, thereby improving uplink data transmission efficiency.

Figure 4:
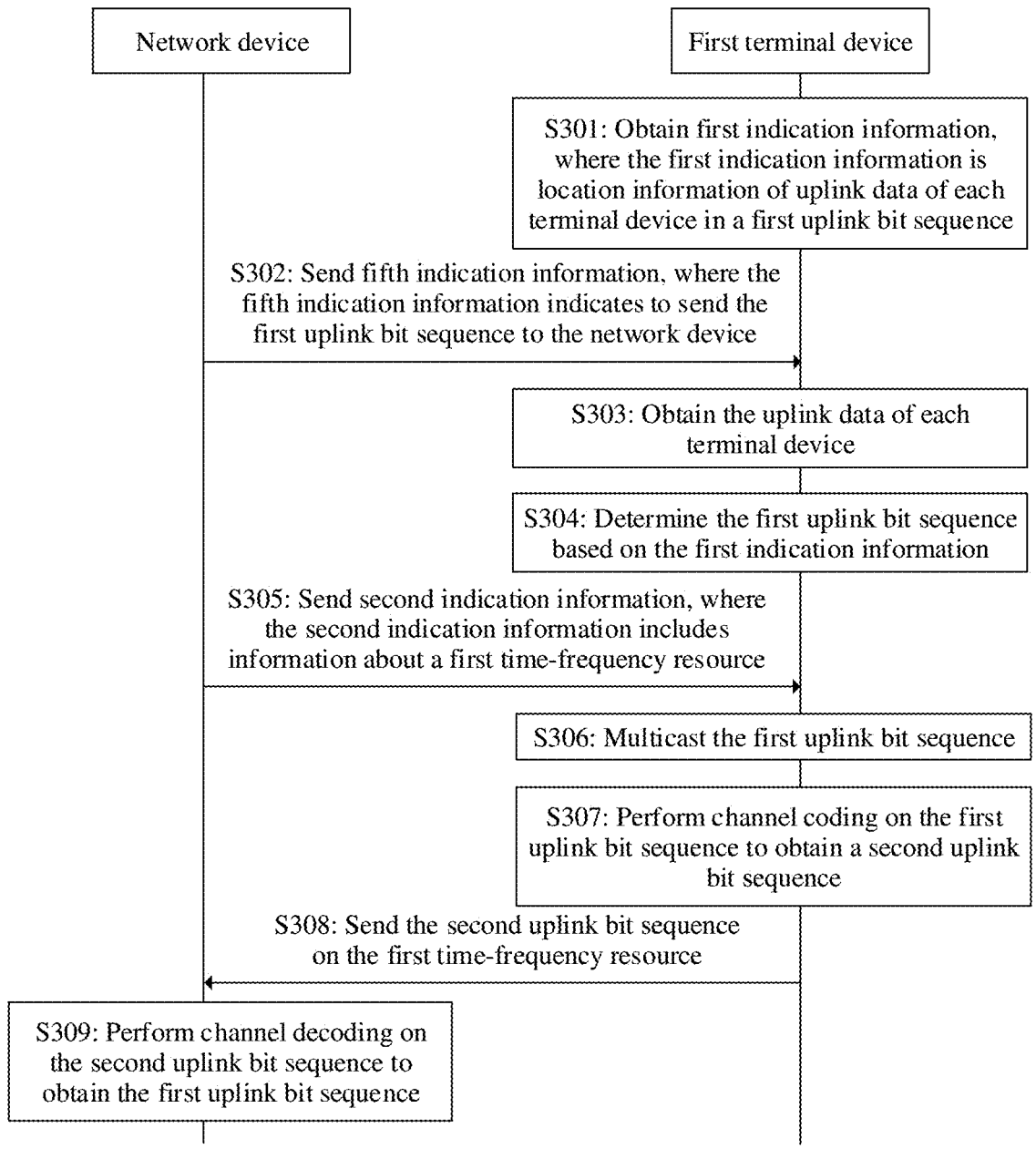
FIG. 4 is a schematic flowchart of a method for aggregation and transmission of multi-user uplink data according to an embodiment of this application.

FIG. 4 is a schematic flowchart of a method for aggregation and transmission of multi-user uplink data according to an embodiment of this application. This embodiment relates to a specific process in which a terminal device sends uplink data to a network device. A core idea of this embodiment is that the network device selects a terminal device to receive uplink data of another terminal device, the terminal device performs bit aggregation on the received uplink data and broadcasts an aggregated uplink data to the another terminal device, and then each terminal device sends the bit-aggregated information to the network device. The following uses an example in which the network device and a first terminal device perform the method for description. The first terminal device is a terminal device in a terminal device group. It may be understood that an execution body of the method may be alternatively performed by a module in the network device and a module in the first terminal device, for example, a chip. As shown in FIG. 4, the method includes the following steps.

For detailed descriptions of S301 to S304, refer to S201 to S204 in FIG. 3.

S305: The network device sends second indication information to the first terminal device. For detailed descriptions of this step, refer to S104 in FIG. 2.

S306: The first terminal device multicasts a first uplink bit sequence.

The first terminal device multicasts the first uplink bit sequence on a fifth preset time-frequency resource by using a third preset transmission parameter. The fifth preset time-frequency resource and the third preset transmission parameter may be indicated by the network device, or may be determined by N terminal devices through negotiation in advance. In a special case, the first terminal device may also broadcast the first uplink bit sequence.

Correspondingly, N−1 terminal devices in the N terminal devices receive the first uplink bit sequence on the fifth preset time-frequency resource.

S307: The first terminal device performs channel coding on the first uplink bit sequence to obtain a second uplink bit sequence. For detailed descriptions of this step, refer to S105 in FIG. 2.

S308: The first terminal device sends the second uplink bit sequence on a first time-frequency resource. For detailed descriptions of this step, refer to S106 in FIG. 2.

S309: The network device performs channel decoding on the second uplink bit sequence to obtain the first uplink bit sequence. For detailed descriptions of this step, refer to S107 in FIG. 2.

In this embodiment, the network device selects one terminal device to receive uplink data of the N−1 terminal devices, performs bit aggregation on the uplink data of the N terminal devices according to a specific rule and broadcasts bit-aggregated information, and then, each terminal device sends the bit-aggregated information to the network device. Compared with the conventional technology in which each terminal device sends its own uplink data to the network device, in this embodiment, a sequence length before coding is increased through bit aggregation, and coding efficiency is improved.

It may be understood that, to implement functions in the foregoing embodiments, the network device and the terminal device include corresponding hardware structures and/or software modules for executing the functions. A person of ordinary skill in the art should easily be aware that, in combination with the units and the method steps in the examples described in the embodiments disclosed in this application, this application can be implemented by hardware or a combination of hardware and computer software. Whether a function is executed by hardware or hardware driven by computer software depends on particular application scenarios and design constraints of the technical solutions.

Figure 5:
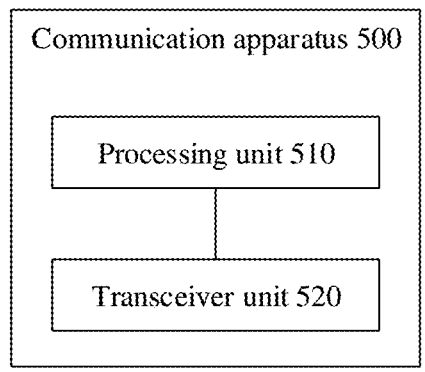
FIG. 5 is a schematic diagram of a structure of a possible communication apparatus according to an embodiment of this application.
Figure 6:
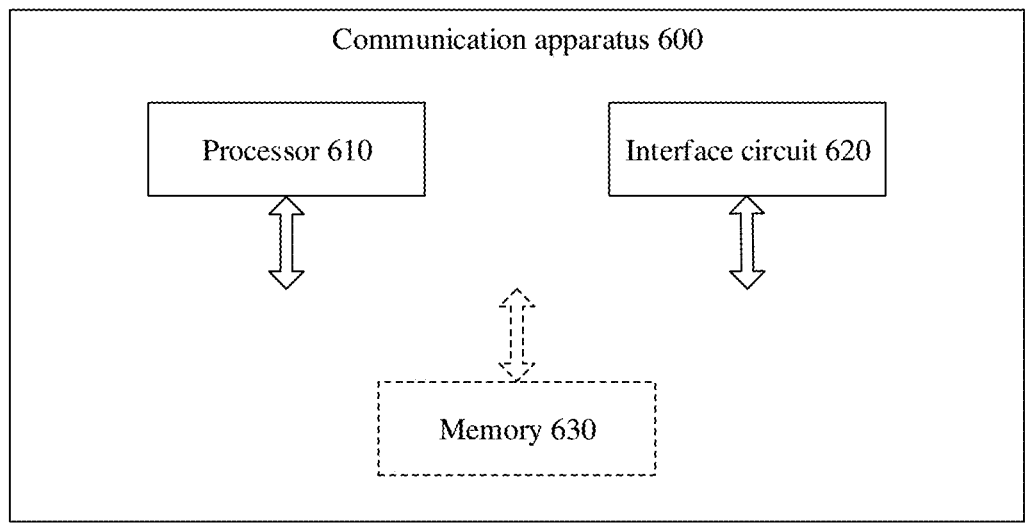
FIG. 6 is a schematic diagram of a structure of a possible communication apparatus according to an embodiment of this application.

FIG. 5 and FIG. 6 are schematic diagrams of structures of possible communication apparatuses according to embodiments of this application. These communication apparatuses can be configured to implement functions of the terminal device or the network device in the foregoing method embodiments, and therefore can also achieve beneficial effects of the foregoing method embodiments. In embodiments of this application, the communication apparatus may be the terminal device 130 or the terminal device 140 shown in FIG. 1, may be the radio access network device 120 shown in FIG. 1, or may be a module (for example, a chip) used in the terminal device or the network device.

As shown in FIG. 5, a communication apparatus 500 includes a processing unit 510 and a transceiver unit 520. The communication apparatus 500 is configured to implement functions of the terminal device or the network device in the method embodiments shown in FIG. 2, FIG. 3, and FIG. 4.

When the communication apparatus 500 is configured to implement a function of the first terminal device in the method embodiment shown in FIG. 2, the transceiver unit 520 is configured to obtain first indication information. The first indication information is location information of uplink data of each of N terminal devices in a first uplink bit sequence. The first uplink bit sequence herein includes the uplink data of each of the N terminal devices, and N is an integer greater than 1. The first terminal device is one of the N terminal devices, and the N terminal devices are N terminal devices in a terminal device group. The transceiver unit 520 is further configured to obtain uplink data of each of the N terminal devices other than the first terminal device. The processing unit 510 is configured to obtain uplink data of the first terminal device. The processing unit 510 is further configured to determine the first uplink bit sequence based on the first indication information and the uplink data of each of the N terminal devices. The processing unit 510 is further configured to perform channel coding on the first uplink bit sequence to obtain a second uplink bit sequence. The transceiver unit 520 is further configured to receive second indication information, where the second indication information includes information about a first time-frequency resource. The transceiver unit 520 is further configured to send the second uplink bit sequence to the network device on the first time-frequency resource.

When the communication apparatus 500 is configured to implement a function of the network device in the method embodiment shown in FIG. 2, the transceiver unit 520 is configured to send the second indication information to the first terminal device, where the second indication information includes the information about the first time-frequency resource. The transceiver unit 520 is further configured to receive, on the first time-frequency resource, the second uplink bit sequence from the first terminal device. The processing unit 510 is configured to perform channel decoding on the second uplink bit sequence to obtain the first uplink bit sequence, where the first uplink bit sequence includes the uplink data of each of the N terminal devices. The N terminal devices are N terminal devices in the terminal device group. The first terminal device is one of the N terminal devices, and N is an integer greater than 1.

When the communication apparatus 500 is configured to implement a function of the first terminal device in the method embodiment shown in FIG. 3, the transceiver unit 520 is configured to obtain the first indication information. The first indication information is the location information of the uplink data of each of the N terminal devices in the first uplink bit sequence. The first uplink bit sequence herein includes the uplink data of each of the N terminal devices, and N is an integer greater than 1. The first terminal device is one of the N terminal devices, and the N terminal devices are the N terminal devices in the terminal device group. The transceiver unit 520 is further configured to receive fifth indication information from the network device. The fifth indication information is used to indicate the first terminal device to send uplink data to the network device. The transceiver unit 520 is further configured to obtain the uplink data of each of the N terminal devices other than the first terminal device. The processing unit 510 is configured to obtain the uplink data of the first terminal device. The processing unit 510 is further configured to determine the first uplink bit sequence based on the first indication information and the uplink data of each of the N terminal devices. The processing unit 510 is further configured to perform channel coding on the first uplink bit sequence to obtain the second uplink bit sequence. The transceiver unit 520 is further configured to receive the second indication information from the network device, where the second indication information includes the information about the first time-frequency resource. The transceiver unit 520 is further configured to send the second uplink bit sequence to the network device on the first time-frequency resource.

When the communication apparatus 500 is configured to implement a function of the network device in the method embodiment shown in FIG. 3, the transceiver unit 520 is configured to send the fifth indication information to the first terminal device, where the fifth indication information is used to indicate the first terminal device to send the uplink data to the network device. The transceiver unit 520 is further configured to send the second indication information to the first terminal device, where the second indication information includes the information about the first time-frequency resource. The transceiver unit 520 is further configured to receive, on the first time-frequency resource, the second uplink bit sequence from the first terminal device. The processing unit 510 is configured to perform channel decoding on the second uplink bit sequence to obtain the first uplink bit sequence, where the first uplink bit sequence includes the uplink data of each of the N terminal devices. The N terminal devices are the N terminal devices in the terminal device group. The first terminal device is one of the N terminal devices, and N is an integer greater than 1.

When the communication apparatus 500 is configured to implement a function of the first terminal device in the method embodiment shown in FIG. 4, the transceiver unit 520 is configured to obtain the first indication information. The first indication information is the location information of the uplink data of each of the N terminal devices in the first uplink bit sequence. The first uplink bit sequence herein includes the uplink data of each of the N terminal devices, and N is an integer greater than 1. The first terminal device is one of the N terminal devices, and the N terminal devices are the N terminal devices in the terminal device group. The transceiver unit 520 is further configured to receive the fifth indication information from the network device. The fifth indication information is used to indicate the first terminal device to send the uplink data to the network device. The transceiver unit 520 is further configured to obtain the uplink data of each of the N terminal devices other than the first terminal device. The processing unit 510 is configured to obtain the uplink data of the first terminal device. The processing unit 510 is further configured to determine the first uplink bit sequence based on the first indication information and the uplink data of each of the N terminal devices. The processing unit 510 is further configured to perform channel coding on the first uplink bit sequence to obtain the second uplink bit sequence. The transceiver unit 520 is further configured to receive the second indication information from the network device, where the second indication information includes the information about the first time-frequency resource. The transceiver unit 520 is further configured to multicast the first uplink bit sequence on a preset time-frequency resource by using a preset transmission parameter. The transceiver unit 520 is further configured to send the second uplink bit sequence to the network device on the first time-frequency resource.

When the communication apparatus 500 is configured to implement a function of the network device in the method embodiment shown in FIG. 4, the transceiver unit 520 is configured to send the fifth indication information to the first terminal device, where the fifth indication information is used to indicate the first terminal device to send the uplink data to the network device. The transceiver unit 520 is further configured to send the second indication information to the first terminal device, where the second indication information includes the information about the first time-frequency resource. The transceiver unit 520 is further configured to receive, on the first time-frequency resource, the second uplink bit sequence from the first terminal device. The processing unit 510 is configured to perform channel decoding on the second uplink bit sequence to obtain the first uplink bit sequence, where the first uplink bit sequence includes the uplink data of each of the N terminal devices. The N terminal devices are the N terminal devices in the terminal device group. The first terminal device is one of the N terminal devices, and N is an integer greater than 1.

For more detailed descriptions of the processing unit 510 and the transceiver unit 520, refer to related descriptions in the method embodiments shown in FIG. 2, FIG. 3, and FIG. 4. Details are not described herein again.

As shown in FIG. 6, the communication apparatus 600 includes a processor 610 and an interface circuit 620. The processor 610 is coupled to the interface circuit 620. It may be understood that the interface circuit 620 may be a transceiver or an input/output interface. Optionally, the communication apparatus 600 may further include a memory 630, where the memory is configured to store instructions executed by the processor 610, store input data required for running the instructions by the processor 610, or store data generated after the processor 610 runs the instructions.

When the communication apparatus 600 is configured to implement the method shown in FIG. 2, FIG. 3, or FIG. 4, the processor 610 is configured to execute a function of the processing unit 510, and the interface circuit 620 is configured to execute a function of the transceiver unit 520.

When the communication apparatus is a chip used in a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

It should be noted that the processor in embodiments of this application may be a central processing unit (CPU), may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor, or any conventional processor.

The method steps in embodiments of this application may be implemented in a hardware manner, or may be implemented in a manner of executing software instructions by the processor. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may further be a component of the processor. The processor and the storage medium may be located in an ASIC. In addition, the ASIC may be located in a network device or a terminal device. Certainly, the processor and the storage medium may exist in a network device or a terminal device as discrete components.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer programs or instructions. When the computer programs or instructions are loaded and executed on the computer, the procedure or functions according to embodiments of this application are completely or partially executed. The computer may be a general-purpose computer, a special-purpose computer, a computer network, or other programmable apparatuses. The computer programs or instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape, or may be an optical medium, for example, a DVD, or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" refers to one or more, and "a plurality of" refers to two or more. The term "and/or" describes an association relationship between associated objects and indicates that three relationships may exist. For example, A and/or B may indicate the following cases: Only A exists, both A and B exist, and only B exists, where A and B may be singular or plural. The symbol "/" in the text description of this application generally represents an "or" relationship between associated objects. In a formula of this application, the symbol "/" indicates a "division" relationship between associated objects.

It may be understood that various numbers in embodiments of this application are merely used for ease of distinguishing, and are not used to limit the scope of embodiments of this application. The sequence numbers of the foregoing processes do not mean an execution sequence, and the execution sequence of the processes should be determined according to functions and internal logic of the processes.

What is claimed is:

1. A method for aggregation and transmission of multi-user uplink data, comprising:
    obtaining first indication information by a first communication apparatus, wherein the first communication apparatus is one of a first terminal device or a module in the first terminal device, wherein the first indication information is location information of uplink data of each terminal device of N terminal devices in a first uplink bit sequence, wherein the first uplink bit sequence comprises the uplink data of each terminal device of the N terminal devices, wherein the first terminal device is one of the N terminal devices, wherein the N terminal devices are N terminal devices in a terminal device group, and wherein N is an integer greater than 1;
    obtaining the uplink data of each terminal device of the N terminal devices;
    determining the first uplink bit sequence based on the first indication information and the uplink data of each terminal device of the N terminal devices;
    receiving second indication information from a network device, wherein the second indication information comprises information about a first time-frequency resource;
    obtaining a second uplink bit sequence by performing channel coding on the first uplink bit sequence; and
    sending the second uplink bit sequence on the first time-frequency resource.

2. The method according to claim 1, further comprising receiving the first indication information from the network device.

3. The method according to claim 1, further comprising:
    determine a location of the uplink data of each terminal device of the N terminal devices in the first uplink bit sequence by negotiating with N−1 terminal devices other than the first terminal device in the N terminal devices.

4. The method according to claim 3, further comprising:
    sending fourth indication information to the network device, wherein the fourth indication information comprises the location information of the uplink data of each terminal device of the N terminal devices in the first uplink bit sequence.

5. The method according to claim 1, wherein at least one of:
    the location information comprises at least one of a start location or an end location of the uplink data of each terminal device of the N terminal devices in the first uplink bit sequence; or
    the location information comprises a sequence number of the uplink data of each terminal device of the N terminal devices in the first uplink bit sequence and a bit length of the uplink data of each terminal device in the first uplink bit sequence.

6. The method according to claim 1, wherein the second indication information further comprises a first transmission parameter, wherein the first transmission parameter is a transmission parameter used by the first communication apparatus to send the first uplink bit sequence, wherein a value of the first transmission parameter is different from a value of a second transmission parameter, wherein the second transmission parameter is a transmission parameter used by a second terminal device to send the first uplink bit sequence, wherein the second terminal device is a terminal device other than the first terminal device in the N terminal devices, and wherein the first transmission parameter and the second transmission parameter each comprise at least one of a redundancy version number, a transport layer number, or a precoding matrix.

7. The method according to claim 1, further comprising:
    receiving fifth indication information from the network device, wherein the fifth indication information indicates to send the first uplink bit sequence to the network device.

8. The method according to claim 7, wherein the fifth indication information comprises identification information of the first terminal device.

9. An apparatus, comprising:
    one or more processors; and
    a non-transitory computer readable memory connected to the one or more processors and storing a program for execution by the one or more processors, the program having instructions to:
        obtain first indication information, wherein the first indication information is location information of uplink data of each terminal device of N terminal devices in a first uplink bit sequence, wherein the first uplink bit sequence comprises the uplink data of each terminal device of the N terminal devices, wherein a first terminal device in which the apparatus is applied is one of the N terminal devices, wherein the N terminal devices are N terminal devices in a terminal device group, and wherein N is an integer greater than 1;
        obtain the uplink data of each terminal device of the N terminal devices;
        determine the first uplink bit sequence based on the first indication information and the uplink data of each terminal device of the N terminal devices;
        receive second indication information from a network device, wherein the second indication information comprises information about a first time-frequency resource;
        obtain a second uplink bit sequence by performing channel coding on the first uplink bit sequence; and
        send the second uplink bit sequence on the first time-frequency resource.

10. The apparatus according to claim 9, wherein the program further includes instructions to:
    receive the first indication information from the network device.

11. The apparatus according to claim 9, wherein the program further includes instructions to:
    determine a location of the uplink data of each terminal device of the N terminal devices in the first uplink bit sequence by negotiating with N−1 terminal devices other than the first terminal device in the N terminal devices.

12. The apparatus according to claim 11, wherein the program further includes instructions to:
  send fourth indication information to the network device, wherein the fourth indication information comprises the location information of the uplink data of each terminal device of the N terminal devices in the first uplink bit sequence.

13. The apparatus according to claim 9, wherein at least one of:
  the location information comprises at least one of a start location or an end location of the uplink data of each terminal device of the N terminal devices in the first uplink bit sequence; or
  the location information comprises a sequence number of the uplink data of each terminal device of the N terminal devices in the first uplink bit sequence and a bit length of the uplink data of each terminal device in the first uplink bit sequence.

14. The apparatus according to claim 9, wherein the second indication information further comprises a first transmission parameter, wherein the first transmission parameter is a transmission parameter used by the apparatus to send the first uplink bit sequence, wherein a value of the first transmission parameter is different from that of a second transmission parameter, wherein the second transmission parameter is a transmission parameter used by a second terminal device to send the first uplink bit sequence, wherein the second terminal device is a terminal device other than the first terminal device in the N terminal devices, and wherein the first transmission parameter and the second transmission parameter each comprise at least one of a redundancy version number, a transport layer number, or a precoding matrix.

15. The apparatus according to claim 9, wherein the program further includes instructions to:
  receive fifth indication information from the network device, wherein the fifth indication information indicates to send the first uplink bit sequence to the network device.

16. The apparatus according to claim 15, wherein the fifth indication information comprises identification information of the first terminal device.

17. An apparatus, comprising:
  one or more processors; and
  a non-transitory computer readable memory connected to the one or more processors and storing a program for execution by the one or more processors, the program having instructions to:
    send second indication information to a first terminal device, wherein the second indication information comprises information about a first time-frequency resource;
    receive, on the first time-frequency resource, a second uplink bit sequence from the first terminal device; and
    obtain a first uplink bit sequence by performing channel decoding on the second uplink bit sequence, wherein the first uplink bit sequence comprises uplink data of each terminal device of N terminal devices, wherein the N terminal devices are N terminal devices in a terminal device group, wherein the first terminal device is one of the N terminal devices, and wherein N is an integer greater than 1.

18. The apparatus according to claim 17, wherein the program further includes instructions to:
  send first indication information to the first terminal device, wherein the first indication information comprises location information of the uplink data of each terminal device of the N terminal devices in the first uplink bit sequence.

19. The apparatus according to claim 17, wherein the program further includes instructions to:
  receiving fourth indication information from the first terminal device, wherein the fourth indication information comprises location information of the uplink data of each terminal device of the N terminal devices in the first uplink bit sequence.

20. The apparatus according to claim 18, wherein at least one of:
  the location information comprises at least one of a start location or an end location of the uplink data of each terminal device of the N terminal devices in the first uplink bit sequence; or
  the location information comprises an aggregation sequence number of the uplink data of each terminal device of the N terminal devices in the first uplink bit sequence and a bit length of the uplink data of each terminal device in the first uplink bit sequence.

* * * * *